May 12, 1953　　　　　S. D. POOL ET AL　　　　　2,637,979
DISPENSING TANK AND VALVE STRUCTURE

Filed Dec. 30, 1949　　　　　　　　　　　　　　2 Sheets-Sheet 1

Inventors:
Stuart D. Pool
William F. Collins
Paul O. Pippel
Atty.

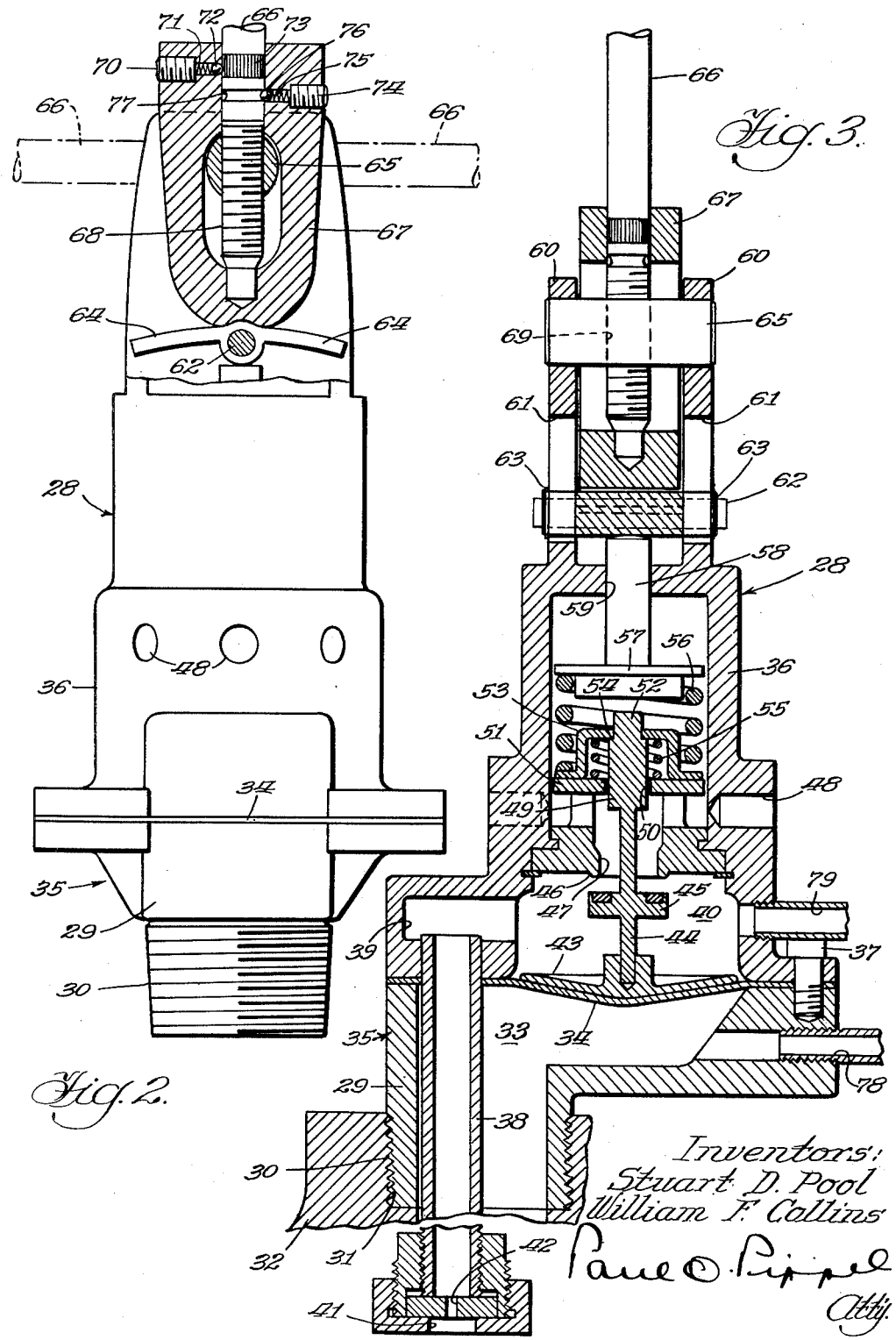

Patented May 12, 1953

2,637,979

UNITED STATES PATENT OFFICE 2,637,979

DISPENSING TANK AND VALVE STRUCTURE

Stuart D. Pool, Moline, and William F. Collins, Westmont, Ill., assignors to International Harvester Company, a corporation of New Jersey Application December 30, 1949, Serial No. 135,894

9 Claims. (Cl. 62—1)

This invention relates to apparatus for applying treating liquids to the soil, and particularly to the application of highly volatile liquids such as anhydrous ammonia.

The use of anhydrous ammonia as fertilizer has become popular of late, especially in localities where the soil is deficient in fixed nitrogen. It has been found that anhydrous ammonia is a quick and rather economical way of securing the needed nitrogen.

There are certain disadvantages in the use of anhydrous ammonia and among them is the rapid gasification of the liquid at normal temperatures and pressures. Where the liquid has been carried in tanks and directed through conduits to furrows formed by cultivator shovels and the like, the liquid has at least partially gasified before it reaches the ground and the quantity of ammonia discharged from the nozzles has fluctuated, with the result that the amount of nitrogen absorbed by the soil in the furrow has been far from uniform.

The principal object of the present invention is to provide apparatus mounted upon a tractor and used in conjunction with cultivating equipment to supply anhydrous ammonia and the like to the furrows formed by the cultivator at a substantially uniform and constant rate of flow.

Another object of the invention is to provide improved control means for supplying anhydrous ammonia to the soil. The invention contemplates the provision of a combination differential pressure regulator and control valve mounted in the upper wall of the tank containing the anhydrous ammonia where the influence of gasification is at a minimum and the rate of flow of the fluid can be accurately measured.

Other objects and advantages of the invention will become clear from the following detailed description when read in conjunction with the accompanying drawings wherein:

Fig. 2 is an enlarged elevational detail of the combination control valve and differential pressure regulator with a portion broken away and showing some of the internal structure in section.

Fig. 3 is a sectional elevation of the combination control valve and pressure regulator seated in the upper wall of the anhydrous ammonia tank.

Figure 1:
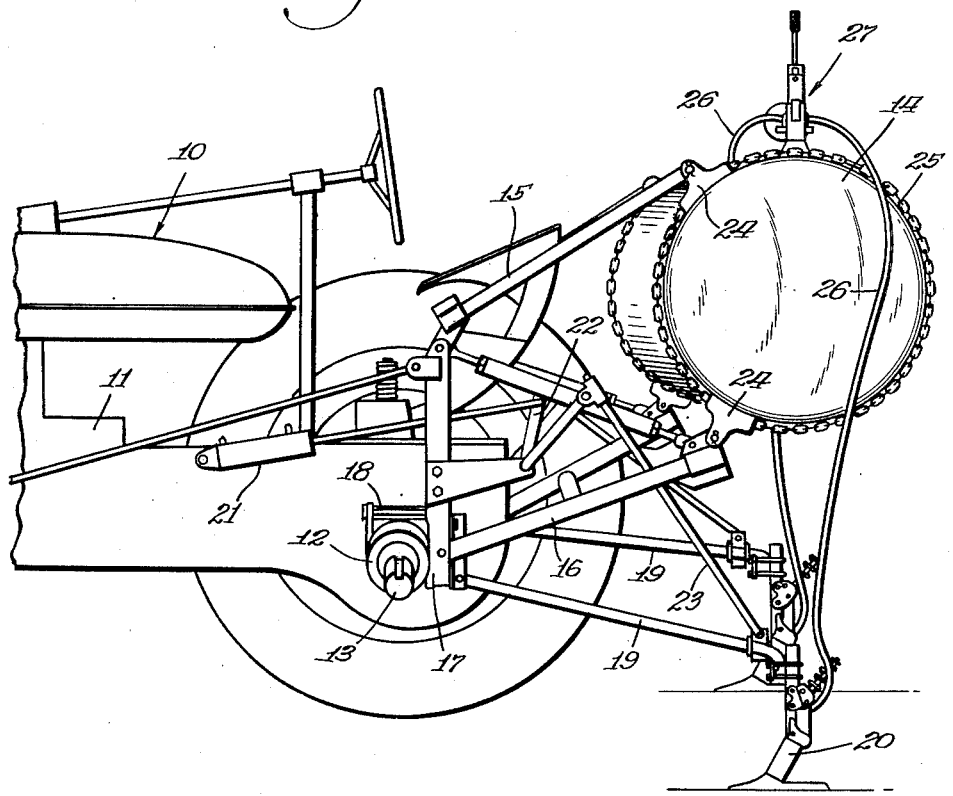
Fig. 1 is a view in side elevation of the rear end of a tractor with one wheel removed showing mounted thereupon an anhydrous ammonia tank and associated apparatus embodying the features of the present invention.
Figure 4:
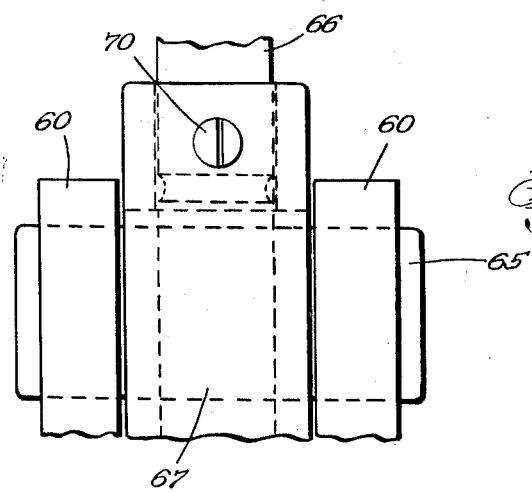
Fig. 4 is an enlarged detail of a portion of the structure shown in Fig. 3.

Referring now to the drawings, it will be noted that the mechanism for dispensing anhydrous ammonia as fertilizer is illustrated as mounted upon a tractor 10 having a longitudinally extending body 11 and a transverse rear axle structure 12 journaling an axle 13. The mounting mechanism by which the anhydrous ammonia tank designated at 14 is carried upon the tractor forms no part of the present invention. This mounting mechanism is described in detail in copending U. S. application Serial No. 104,546, filed July 13, 1949.

Briefly, the tank 14 is connected to the tractor by a pair of vertically spaced generally parallel links 15 and 16, the forward ends of which are pivoted at vertically spaced locations upon a bracket 17 secured to the rear axle housing of the tractor at opposite sides of the body 11 thereof by clamps 18. Also mounted upon the rear axle housing 12 at opposite sides of the tractor body are drag links 19 which are pivotally connected to the tractor at their forward ends and are provided at their rear ends with cultivator shovels 20. The cultivator shovels are raised and lowered relative to the tractor by a hydraulic cylinder 21 anchored to the tractor and powered therefrom, and connected through a bell crank 22 to a lifting rod 23 which in turn is connected to the drag link 19.

The rear ends of parallel links 15 and 16 are provided with clamping members 24 to which is secured an endless chain 25, one being provided at each end of the tank for each set of parallel links 15 and 16 at opposite sides of the tractor. Chain 25 surrounds the cylindrical tank and secures the latter to the supporting structure.

Anhydrous ammonia under pressure and preferably under suitable temperature conditions is stored in tank 14 in liquid form and is fed through a plurality of hose connections 26, only two of which are shown. The ends of the hose 26 are connected to the shovels 20 and so arranged as to direct a stream of anhydrous ammonia fluid into the furrow made by the shovels in the ground.

It has already been pointed out that anhydrous ammonia is a higly volatile liquid readily turning into a gas at lower pressure or higher temperature conditions and is difficult to meter accurately to the soil so that uniform quantities may be deposited in the furrow. In order to provide optimum conditions for the deposition of anhydrous ammonia as fertilizer into the soil, applicants have incorporated with the tank 14 by seating in the upper wall thereof a combination control valve for releasing or shutting off the flow of ammonia from the tank and a differential pressure regulator so located with respect to the fluid to be regulated as to provide maximum accuracy in the discharge of uniform quantities thereof. This valve control and regulator structure is designated by the numeral 27 and as noted particularly well in Figs. 2 and 3 comprises a housing 28, the lower portion of which is broadened at the base and provided with a depending tubular pipe section 29 threaded at 30 for reception in the threaded opening 31 in the upper wall 32 of the tank 14.

Opening 31 and the pipe section 29 communicate directly with the interior of the tank 14 and the fluid therein passes upwardly through the pipe section 29 into a back-pressure compartment 33. Compartment 33 is closed off from the main discharge portion of the valve by a diaphragm member 34 of any suitable flexible material.

The base portion of the valve and regulator structure incorporating the threaded tubular member 29 is designated by the numeral 35 and is separated from the upper or discharge portion 36 of the valve structure by extensions of the diaphragm member 34. The parts are held together by suitable bolts 37.

An elongated pipe member 38 extends upwardly through the wall of the upper discharge portion 36 of the valve structure and communicates with an opening 39 which opens into the fluid discharge compartment 40 of the valve structure. Pipe 38 is considerably smaller in diameter than the pipe section 29 and extends downwardly therethrough into the tank 14 to a location near the bottom thereof where no gasification of the liquid anhydrous ammonia occurs. Liquid anhydrous ammonia passes through an opening 41 in the bottom of the pipe 38 and a restricted opening 42 and is discharged into the discharge compartment 40, the pipe 38 being sealed against leakage of the fluid into the compartment 33. Fluid discharged through the pipe 38 contacts the upper face of the diaphragm 34 which is provided with a backing plate 43 to which is anchored the lower end of the valve stem 44. Fluid passing through pipe 38 into the compartment 40 travels upwardly between an enlarged portion 45 of the valve stem and the edges of valve seat 46 into the chamber 47 and outwardly through radially extending conduits 48, a plurality of which are provided at circumferentially spaced locations about the periphery of the valve housing. The upper end of the valve stem is provided with an enlarged portion 49 slidably received in an opening 50 in an insert member 51. The upper end of portion 49 is constricted at 52 for reception in an opening provided in a cap member 53 which engages shoulders 54 at the upper end of the valve stem. A spring 55 surrounds the portion of the valve stem encased within the cap 53. Cap 53 is surrounded by the lower portion of a spring 56, the upper end of which abuts against the broadened base 57 of a vertically slidable member 58 slidable in an opening 59 in the upper wall of the valve housing.

At the upper end of the valve housing and projecting upwardly therefrom are a pair of laterally spaced ears 60 provided with vertically extending slots 61. A pin 62 extends through the openings 61 and is held against axial displacement therefrom by washers 63. Pin 62 rests upon the upper end of the slidable spindle member 58 and is provided with axially projecting wing extensions 64. The extensions 64 form an arcuate cam, the function of which will hereinafter become clear.

Also mounted in the ears 60 at the upper ends thereof is a spindle 65 upon which is mounted a control member in the form of an upstanding handle 66 having at its lower end a horse-shoe shaped cam member 67, the lower end of which rests upon the cam 64.

From a study of Fig. 2 it will be clear that when handle 66 is rocked upon its pivot pin 65 to opposite sides of a vertical position as indicated in dotted lines in Fig. 2, the shaft 58 will rise by virtue of action of the spring 56 pressing against the base 57 thereof and spring 55 will urge the cap 53 upwardly allowing valve stem 44 to rise and the enlargement 45 to engage the valve seat 46 and cut off the flow of fluid from compartment 40 outwardly through the discharge exits 48. It is understood, of course, that a hose 26 may be connected to any one or each of the radial openings 48.

It will be noted that the lower end of handle 66 is secured to the cam 67 and that a portion of the lower end of the handle is threaded at 68 for reception in a threaded opening 69 passing through spindle 65. Thus handle 66 may be rotated about its axis to raise or lower the cam 67 and therefore the shaft 58 and thus control the distance between the member 45 and the valve seat 46 to regulate the flow of fluid from conduit 38 in the tank 14 into and through the outlets 48. A closure of the valve is accomplished very quickly as will be evident from a study of the drawings. Movement of handle 66 to one of the positions indicated in dotted lines in Fig. 2 causes immediate and complete closure of the valve. The handle 66 is held against accidental turning about its axis by a set screw 70 which engages a spring 71 and a ball 72 adapted to be seated in vertical grooves 73 formed in the handle 66. Axial movement of the handle 66 is prevented by a set screw 74 engaging a spring 75 and a ball 76 adapted to be received in a circumferential groove 77 formed in the handle. Rapid closure of the valve and operation of the handle 66 are facilitated by the cam 64 mounted on pin 62 which rocks about the axis of the pin when the handle 66 is pushed to one side or the other. This ability to close the valve by pushing or pulling to opposite sides of the center position is very desirable and important, particularly in dealing with a highly volatile liquid such as anhydrous ammonia.

The pressure of the fluid on both sides of the diaphragm 34 affects the position of the valve closure member 45 with respect to the valve seat 46 and therefore the quantity of fluid flowing through the conduit 38 into the compartment 40 and out of the radial outlets 48. The differential pressure across the diaphragm may be measured and recorded by conventional mechanism in the form of a differential pressure gauge, not shown, which may be attached to tubes 78 and 79. Tube 78 opens into the back-pressure compartment 33, and tube 79 into compartment 40. The pressure differential on the diaphragm 34 is adjustable by rotating the control handle 66 about its axis to raise or lower the valve stem 44.

The operation of the fluid dispensing mechanism of the present invention should be clearly understood from the foregoing description. It should likewise be understood that, in anhydrous ammonia, applicants are dealing with a difficultly manageable fluid requiring special equipment and handling for securing the best results. Various

What is claimed is:

1. In apparatus for supplying a stream of anhydrous ammonia and like highly volatile treating liquids from a supply tank to the soil as fertilizer at a substantially constant rate at a location remote from the tank, an opening formed in the upper wall of the tank, a differential pressure regulating valve at the top of the tank, a flexible diaphragm dividing the valve into a back pressure compartment and a fluid discharge compartment, a pipe section integral with the valve and seated in said opening to receive fluid directed against one side of said diaphragm, a tubular member of lesser diameter than the pipe section communicating with the fluid discharge compartment of the valve, said tubular member extending vertically downwardly through said pipe section to a location adjacent the bottom of the tank, whereby the fluid fed to the pressure regulating valve outlets is in a substantially uniform liquid state, and means on opposite sides of the diaphragm for connecting a pressure differential gauge to the valve.

2. In apparatus for supplying a stream of anhydrous ammonia and like highly volatile treating liquids from a supply tank to the soil as fertilizer at a substantially constant rate at a location remote from the tank, an opening formed in the upper wall of the tank, a differential pressure regulating valve at the top of the tank, a flexible diaphragm dividing the valve into a back pressure compartment and a fluid discharge compartment, a pipe section integral with the valve and seated in said opening to receive fluid directed against one side of said diaphragm, a tubular member communicating with the fluid discharge compartment of the valve, said tubular member extending downwardly into the tank below the level of the liquid whereby the fluid fed to the discharge compartment of the valve is in a substantially uniform liquid state.

3. In apparatus for discharging from a supply tank carried upon a support, anhydrous ammonia or like highly volatile liquid and delivering it at a substantially constant rate at a location remote from the tank, a threaded opening formed in the upper wall of the tank, means for delivering fluid to the discharge point at a constant rate of flow comprising a valve structure having a differential pressure responsive diaphragm, a threaded inlet portion receivable in said opening and communicating with one side of said diaphragm to direct fluid vapor thereagainst, a discharge outlet, a second inlet comprising a tubular member extending through said opening and providing delivery of fluid from the tank to the other side of the diaphragm and the discharge outlet, a valve element movable to and from a position to close said discharge outlet, and manually operable control means incorporated in the valve structure and operatively connected to said valve element for opening and closing the discharge outlet.

4. In apparatus for discharging from a supply tank carried upon a support, anhydrous ammonia or like highly volatile liquid and delivering it at a substantially constant rate at a location remote from the tank, a threaded opening formed in the upper wall of the tank, means for delivering fluid to the discharge point at a constant rate of flow comprising a valve structure having a differential pressure responsive diaphragm, a threaded inlet portion receivable in said opening and communicating with one side of said diaphragm to direct fluid thereagainst, a discharge outlet, a second inlet comprising a tubular member of smaller diameter than the first mentioned inlet portion extending therethrough to a location adjacent the bottom of the tank and providing delivery of fluid from the tank to the other side of the diaphragm and the discharge outlet.

5. In apparatus for discharging from a supply tank carried upon a tractive vehicle, anhydrous ammonia or like highly volatile liquid and delivering it at a location remote from the tank at a substantially constant rate, a combination differential pressure regulator and control valve having fluid tight compartments, means for securing the valve to the upper wall of the tank including an opening communicating with the interior of the tank to accommodate passage of fluid vapor to one compartment, a differential pressure responsive diaphragm separating said compartments, an inlet tube extending into said tank and communicating with the other compartment, outlets formed in the valve for discharging fluid from the latter compartment, a valve element movable to and from a position to close said discharge outlets, and manually operable control means carried by the valve and operatively connected to said valve element for opening and closing said outlets.

6. In apparatus for discharging from a supply tank carried upon a tractive vehicle, anhydrous ammonia or like highly volatile liquid and delivering it at a location remote from the tank at a substantially constant rate, a combination differential pressure regulator and control valve having fluid tight compartments, means for securing the valve to the upper wall of the tank including an opening communicating with the interior of the tank to accommodate passage of fluid vapor to one compartment, a differential pressure responsive diaphragm separating said compartments, an inlet tube extending into said tank and communicating with the other compartment, outlets formed in the valve for discharging fluid from the latter compartment, a valve stem secured to the diaphragm and movable to close said outlets, manually operable control means for moving the valve stem to open and close the valve, and adjusting means incorporated in said control means and connected to said valve stem for adjusting the latter to vary the differential pressure on the diaphragm.

7. In apparatus for discharging from a supply tank carried upon a support, anhydrous ammonia or like highly volatile liquid and delivering it at a location remote from the tank at a substantially uniform rate, a combination differential pressure regulator and control valve structure comprising a housing having compartments therein, a differential pressure responsive diaphragm separating said compartments, means for securing said valve structure to the wall of the tank, separate conduits providing communication between the upper and lower portions of the tank and the respective compartments, outlets formed in the housing for discharging fluid from one compartment, a valve seat and stem, the latter being secured to the diaphragm and movable to close said outlets, a lever having a camming surface operatively engageable with said valve stem and angularly rockable to move the latter, said lever being axially movable to adjust the position of the valve stem relative to the valve seat, whereby to adjust the pressure differential on the diaphragm.

8. In apparatus for discharging from a supply tank carried upon a support, anhydrous ammonia or like highly volatile liquid and delivering it at a location remote from the tank at a substantially uniform rate, a combination differential pressure regulator and control valve structure comprising a housing having compartments therein, a differential pressure responsive diaphragm separating said compartments, means for securing said valve structure to the wall of the tank, separate conduits providing communication between the upper and lower portions of the tank and the respective compartments, outlets formed in the housing for discharging fluid from one compartment, a valve seat and stem, the latter being secured to the diaphragm and movable to close said outlets, a control lever in substantial axial alignment with the valve stem when the valve is open and having a camming surface operatively engageable with said valve stem, said lever being angularly rockable in either of two directions to close the valve.

9. In apparatus for discharging from a supply tank carried upon a support, anhydrous ammonia or like highly volatile liquid and delivering it at a location remote from the tank at a substantially uniform rate, a combination differential pressure regulator and control valve structure comprising a housing having compartments therein, a differential pressure responsive diaphragm separating said compartments, means for securing said valve structure to the wall of the tank, separate conduits providing communication between the upper and lower portions of the tank and the respective compartments, outlets formed in the housing for discharging fluid from one compartment, a valve seat and stem, the latter being secured to the diaphragm and movable to close said outlets, a control lever in substantial axial alinement with the valve stem when the valve is open and having a camming surface operatively engageable with said valve stem, means biasing the valve stem to engagement with the cam and its valve-closed position, said lever being angularly rockable in either of two directions to close the valve and axially adjustable to vary the position of the valve stem relative to the valve seat.

STUART D. POOL.
WILLIAM F. COLLINS.

References Cited in the file of this patent

UNITED STATES PATENTS

| Number | Name | Date |
|---|---|---|
| 2,049,239 | Wilcox | July 28, 1936 |
| 2,285,932 | Leavitt | June 9, 1942 |
| 2,365,423 | MacSporran | Dec. 19, 1944 |
| 2,415,251 | Leavitt | Feb. 4, 1947 |
| 2,489,028 | Graham et al. | Nov. 22, 1949 |
| 2,497,793 | Ransome | Feb. 14, 1950 |